Patented Oct. 10, 1950

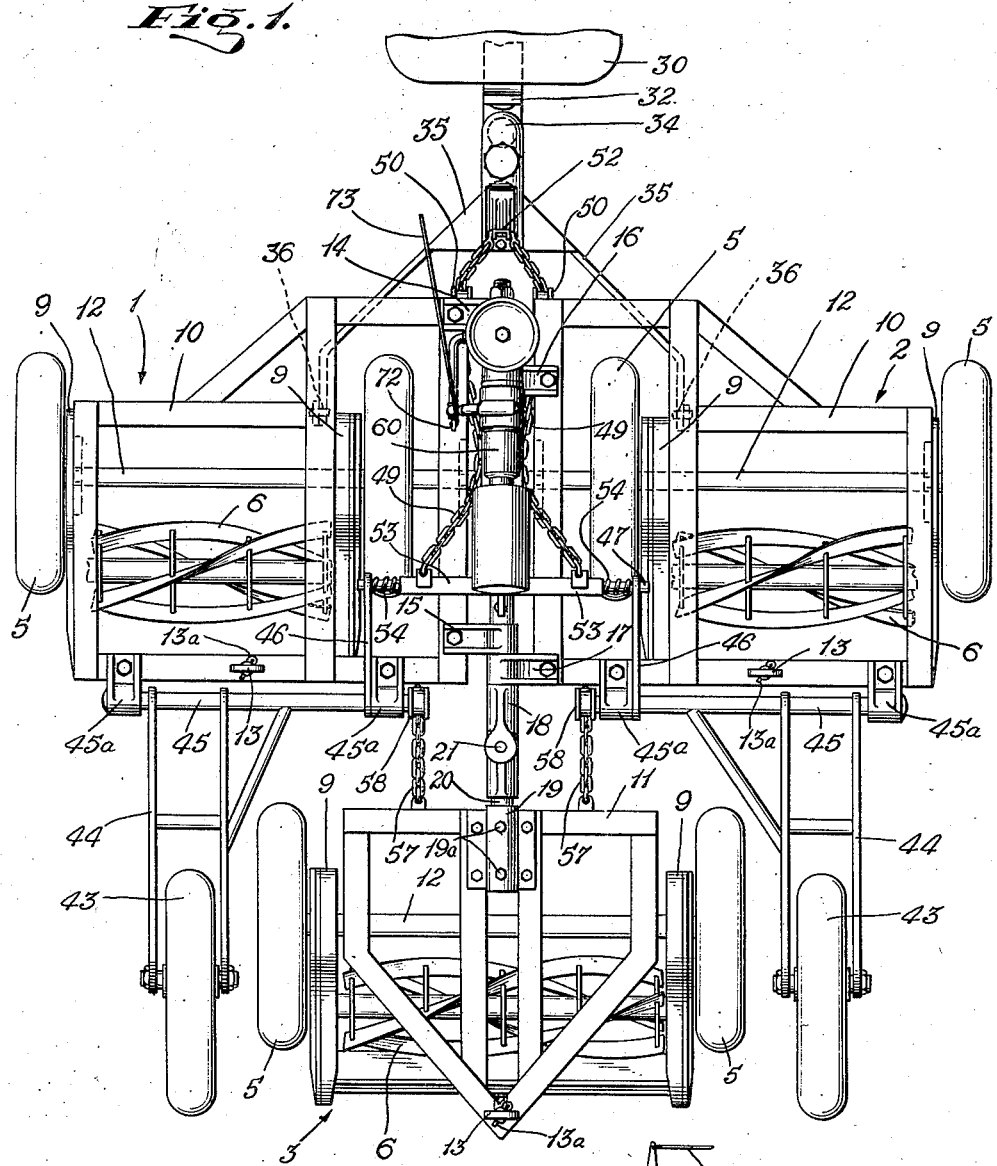

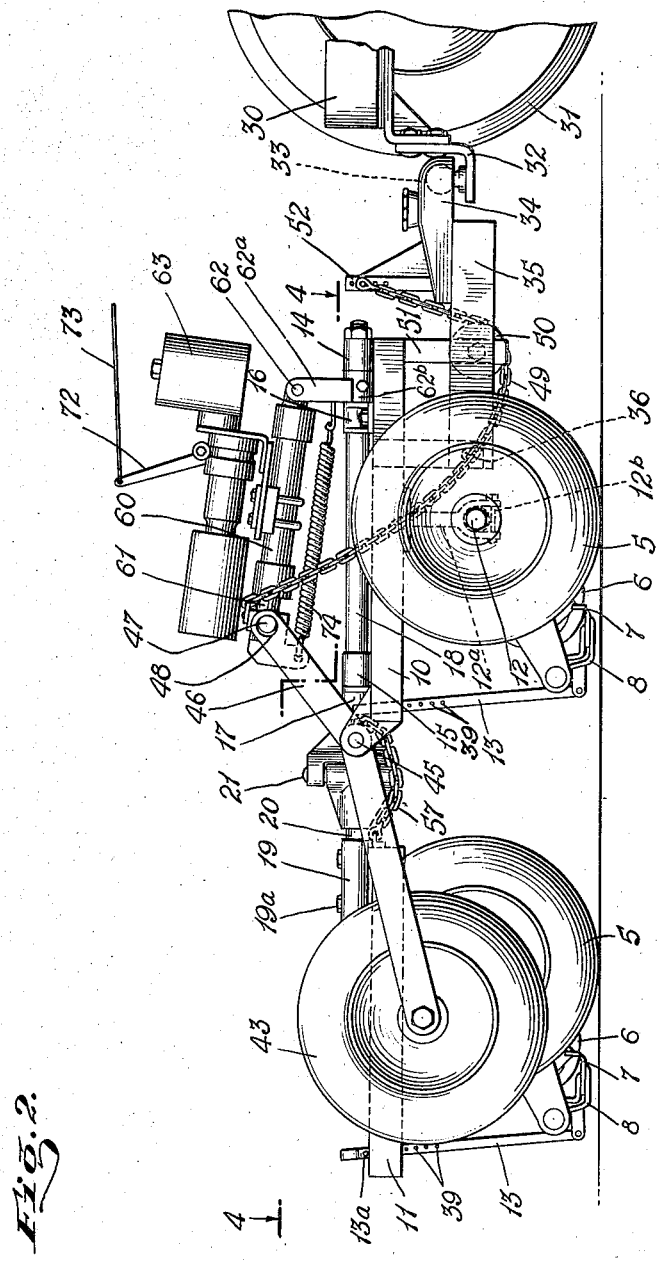

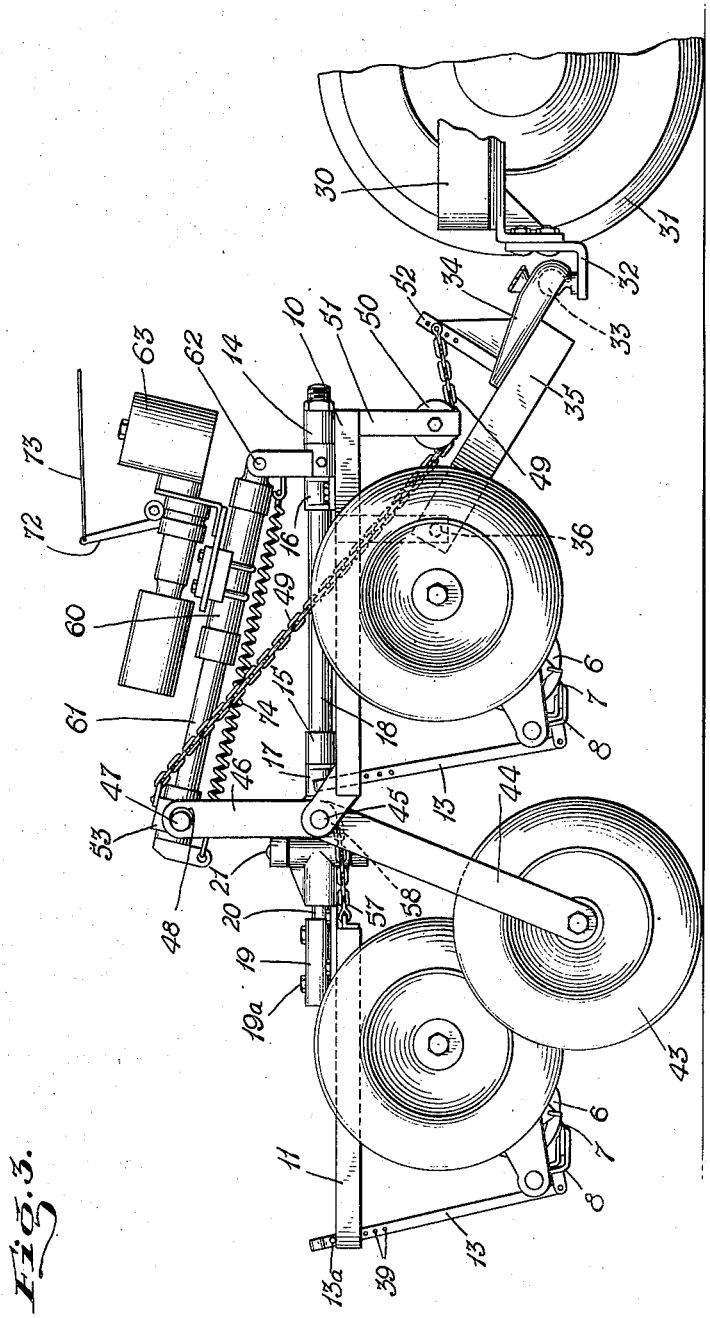

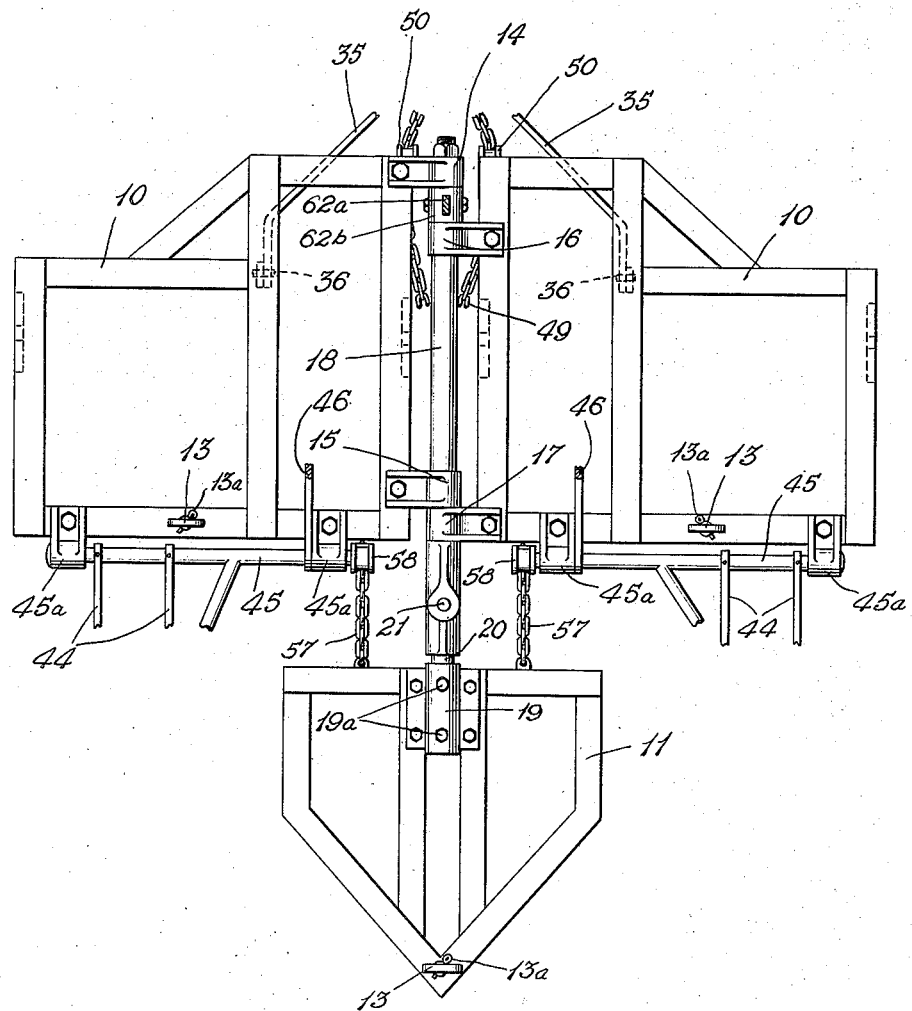

2,525,047

UNITED STATES PATENT OFFICE 2,525,047

GANG LAWN MOWER

Edmund R. Sawtelle, Shawnee-on-Delaware, and John I. Blair and Herbert Imbt, Stroudsburg, Pa., assignors to Worthington Mower Company, Stroudsburg, Pa., a corporation of Delaware Application November 23, 1946, Serial No. 712,020

10 Claims. (Cl. 56—7)

Our invention relates to tractor drawn gang lawn mowers, and more especially to a gang arrangement wherein the various mower units can be held raised from the ground while the gang is drawn from one place of operation to another.

Speaking generally, various arrangements for adapting multiple-mower machines for movement from one place of operation to another have been devised heretofore. In one form of such arrangements a lever or the like is provided on each mower unit by which the cutting mechanism of the respective units (i. e. the fly knife or reel and the ground knife, with associated parts) can be swung partly around, say, the axis of the ground wheels of the unit, and thus held raised from the ground while traveling from one place to another. Such arrangements leave the ground wheels of the various units running on the ground however and while such arrangements are satisfactory for occasional movements at relatively slow speeds over turf, they are not entirely suitable for repeatedly running up and down over curbs nor for travel on paved streets at anything like the speed of ordinary city traffic. In another form of arrangement devised heretofore, the tractor is provided with equipment for hoisting the gang bodily from the ground and carrying it suspended. Such latter arrangements may be adapted for transporting the equipment over curbs and moving it through city streets at a fair rate of speed, but they require specially built or specially equipped tractors.

In contrast with such prior arrangements our invention provides a mower wherein the cutting mechanism or mechanisms can be raised from the ground in a desirable manner, and especially a gang lawn mower that is adapted to be drawn by substantially any tractor that may be available, and which requires only such additions or attachments to the tractor as can be made readily and which are of such a nature that they need not detract from the utility of the tractor for other services when not drawing the mower. At the same time the invention provides, or provides for, a tractor-mower unit that is capable of mowing effectively at relatively high speeds and is capable of moving from place to place substantially as freely as an automotive truck, and through paved streets at substantially the normal speeds of city traffic. Our invention thus provides gang mowers adapted to be drawn by tractors that are used for other purposes at other times, and that may have been purchased previously or that may be purchased subsequently for other purposes, and also gang mowers that are especially suited for cutting the lawns of parks distributed throughout a city and which thus need to be drawn from place to place through the streets.

Briefly our invention comprises a number of mower units connected together into a gang and, mounted on the gang or unitary structure into which the mower units are collected, wheels which can be depressed to raise the gang from the ground and support the gang while being moved from one place to another. The depressible wheels may suffice to carry the mower units without the aid of any other ground-engaging rolling support, or they may be aided by the tractor in carrying the mower units; by using the attachment by which the tractor draws the gang to support the gang in part during movement from one place to another (or by using another attachment to the tractor special for this purpose), two carrying wheels on the gang will suffice. The mechanism for depressing the wheels, which also may be and preferably is mounted on the gang, may be a power unit, and this power unit may be either self contained or of a type that can be furnished with power from the tractor, say from the tractor battery. Preferably the power unit is of a type which requires the expenditure of power only when raising or depressing the gang-carrying wheels, the wheels being locked in their depressed and elevated positions as it were, without the continued use of power. The various individual mower units can be connected together in any desired relation, e. g. either with or without intermediate hinges or other form of flexible interconnection to accommodate the gang to irregularities of the ground, or for permitting turning around curves without scuffing the turf, etc. Where there is such flexibility as would permit, say, undesired swinging or swaying of one or more of the mower units while passing through streets, or that would interfere with the raising or supporting of the gang, etc., mechanism can be provided on the gang to nullify the flexibility when the carrying wheels are depressed. For example, the power unit which depresses the carrying wheels to raise the gang may bring such nullifying mechanism into action at the same time. Speaking generally, unless the various mower units are connected together permanently into a substantially inflexible gang (which will not be desirable in many cases), or unless the gang is so wide as to need to be folded from one or both sides when moving from one location to another, we prefer to so arrange such nullifying mechanism or elements as to make the gang a substantially rigid inflexible structure while the gang-carrying wheels are in operative position.

We believe that in most instances a three-unit gang will be preferable, two units being placed in a forward row and the third being placed behind them to cut the intermediate strip passed uncut by the first two. Preferably we hinge the two forward units to each other on a horizontal fore and aft axis, but otherwise mount them substantially rigidly with respect to each other and we hinge the third unit to the first two on a vertical axis and also on a horizontal fore and aft axis, but substantially rigid with respect to the forward two so far as turning on any horizontal axis transverse to the direction of movement and the fore and aft axis of the machine is concerned.

The accompanying drawings illustrate this latter form of our invention and other preferential constructions. Fig. 1 is a plan view of the gang mower and the rear end of, say, a conventional tractor attached for towing the gang. Fig. 2 is a side view of the same mechanism with the mower units in cutting positions. Fig. 3 is a similar side view but showing the gang elevated for movement from one place of operation to another. Fig. 4 is a plan view about on the line 4—4 of Fig. 2 looking in the direction of the arrows but showing only the frames through which the units are interconnected and some associated mechanism. Fig. 5 is a diagrammatic illustration of the power unit of the machine.

In the machine illustrated each of the three mower units 1, 2 and 3 includes a pair of ground wheels 5, a rotary cutter 6 (e. g. a fly knife), a cooperating bed knife 7 and a ground plate 8 to protect the bed knife and its mounting from stones, hummocks, etc., and also a pair of side members 9, one adjacent each ground wheel 5; the rotary cutter conventionally called a reel), its cooperating bed knife, the ground plate, etc., may be regarded as carried by and between the two side member 9 in a conventional manner, and gears within one or both the side members may connect the reel to the one or both of the adjacent ground wheels 5 of the unit for driving the reel as is common. Connections flexibly unite these mower units and therewith form a unitary structure for mowing. These connections include in the present instance, at each mower unit, a frame 10 of the front row mower unit or 11 of the rear row mower unit which is mounted by standards 12a on a rod 12 which, conventionally, connects the two side members 9 of the mower unit. A rod 13 attached to the rear end of each mower unit (conventionally to the ground plate 8 of the unit) extends upwardly through a hole in the frame 10 or 11 of the unit and by means of a cross pin 13a is suspended by the frame to support the rear end of the unit; each rod 13 may be pierced by a number of holes 39 for its cross pin 13a so that the reel 6 and bed plate 7 can be adjusted for various heights of cut (Fig. 2). Also each frame standard 12a embraces its cross rod 12, by means of a yoke formation and a bolt 12b at its lower end in the present instance. By lifting one of the frames 10 or 11 therefore, the remainder of the respective mower units can be lifted also, the frame acting through the suspension rod 13 and the standards 12.

The frames 10 and 11 are connected together directly. One of the forward frames 10 carries horizontal knuckles 14 and 15, and the other carries horizontal knuckles 16 and 17, these knuckles being disposed to contain a fore and aft pivot pin or rod 18. These knuckles are rotatable on the pin or rod 18 and accordingly permit the two units 1 and 2 to hinge on the horizontal axis of the pin or rod 18 in following irregularities of the ground, but the two units 1 and 2 can not turn on a vertical axis with respect to each other. In line with the pin or rod 18, the frame 11 of the rear unit 3 is provided with a bracket 19 which contains a complementary fore and aft rod 20 which is connected to the forward fore and aft pivot pin 18 by a vertical knuckle 21. Particularly for the purposes of the present invention, the rod 20 is non-rotatively fixed in the bracket 19, for example by means of pins at 19a. However the pin or rod 18 being rotative in the knuckles 14 to 17, the rear unit 3 can rock on the axis of 18 in following the irregularities of the ground. Also the vertical knuckle 21 permits the rear mower unit 3 to incline to the right and left at this knuckle when going around curves and thus avoids scuffing the turf by the rear unit when turning. It will be observed however that the construction renders the gang a rigid unit so far as concerns any horizontal axis prependicular to the fore and aft rods 18 and 20, i. e. any horizontal axis is transverse to the direction of movement of the gang.

At 30 is indicated the rear end of a motor driven tractor which may be of any conventional form. A rear wheel of this tractor is indicated at 31. For drawing the gang, a bracket 32 carrying, say, the ball 33 of a ball and socket joint is attached to the rear end of the tractor. The socket 34 of this joint is carried by a horizontal draft member or members 35 that is or are hinged at 36 to downward extensions from the forward frames 10 of the units. Through this mechanism the tractor draws the forward units 1 and 2 of the gang and through the pins or rods 18 and 20 the rear unit 3 is drawn by the forward units. It will be observed that horizontal hinging may be used at 36, since when cutting grass, all six of the mower ground wheels 5 rest on the ground, and hence the gang is entirely self-supported at that time. This renders the mower units independent of the tractor in following the irregularities of the ground.

In operation therefore the tractor at 30 simply tows the mower gang over the ground, and the ground wheels 5 drive the reels 6 to cut the grass in a conventional manner. The joints at 14, 16 and 15, 17 and at 33 and 36 permit the three units of the gang to follow the irregularities of the ground rather independently of each other and quite uninfluenced by the tractor, and when turning the hinging on vertical axes at the ball 33 and the knuckle 21 permit the tractor, the group of forward mowers, and the rear mower to incline to the right and left as three separate units quite independently of each other.

As before pointed out the machine so far described is illustrative of the type of gang to which we prefer to apply our present invention. Obviously it can be modified considerably without departing from the type and even more so far as concerns our present invention.

To hold the gang as a whole elevated well above the ground in accordance with our invention, while being drawn from one place of operation to another, gang-carrying wheels 43 are added to the structure consisting of mowers and connectors before described. Each of these wheels 43 is placed rather well to one side of the gang by preference (Fig. 1), and is carried on a crankarm consisting of a frame 44, a shaft 45, and an arm 46. The frame 44 is fastened to the horizontal shaft 45 which is rotatably mounted (e. g. by brackets 45a) on a forward mower frame 10. The upwardly extending arm 46 is non-rotatably attached to each of the shafts 45, and a cross bar 47 extends through holes 48, somewhat larger than the cross bar, pierced in the upper ends of the two arms 46. The oversize of the holes 48, compared with their cross bar 47, provides looseness that prevents the cross bar from interfering with the hinging of the forward mower units 1 and 2 around the rod or pin 18 in following the irregularities of the ground. It will be apparent that by thrusting the cross bar or rod 47 to the left from its position in Fig. 2 the carrying wheels 43 can be thrust to the ground and thereby the mower units raised from the ground more or less as shown in Fig. 3. However, rather than use an additional carrying wheel or wheels to provide three or four points of support for the gang when the mower units are elevated, we prefer to use the tractor itself as a further point or points of support, thus rendering not more than two gang-carrying wheels such as 43 quite sufficient. This may be accomplished in various ways, but preferably we use the draft bracket 32 as also the point of supporting connection to the tractor since a single bracket serving both draft and supporting purposes can be attached in one way or another to substantially any tractor rather readily and without interfering with any other uses to which it may be desirable to put the tractor. Other connections are used to nullify the flexibility of the structure when this structure is to be raised to raise its mowers from the ground. These too may assume various forms, but preferably, when there is such hinging we use a chain or chains or other form of flexible member. For example a cable 49 as shown in the drawings will serve to nullify the effect of such hinging as at 36 and cause a part of the weight of the gang to be imposed on the draft bracket such as 32. The same cables may nullify also the effect of such hinging as there is at the rod or pin 18 between units in the present instance. While one cable will suffice in most instances, we prefer to use two. These two cables 49 are attached to, for example, the cross bar 47 and extended thence underneath pulleys or other guides 50 attached to the forward ends of the two frames 10, as by standards 51, and from there to a higher point on the socket-draft-member organization 34, 35, say to a standard 52 mounted on the socket member 34. To provide some freedom and ready attachment at the cross bar 47 a member 53 may be slidably mounted on the cross bar and the cables 50 attached to it; springs 54 can be used to urge the member 53 toward a center position, and the member 53 can be mounted non-rotatively on the cross bar if necessary or desired. The cables 49 are of such length that they hang sufficiently slack to permit the joint or joints 36 to be effective when the mower units rest on their own ground wheels 5, Fig. 2, but they are so short, and the operating arms 46 are given such lengths and range of movement, that the cables tighten against the guides 50 when the gang-carrying wheels 43 are brought into action and thus cause the forward end of the gang to be supported by the bracket 32, Fig. 3, when the gang is lifted by the carrying wheels 43. By proper adjustment of the cable length and arm length and movement range, the gang can be carried in a substantially horizontal position when elevated, if desired, as shown in the latter figure of the drawing.

In an analogous manner the effect of the vertical knuckle 21, and also the effect of the horizontal knuckles 14 to 16 on the rear unit, can be nullified at the same time, and thus the rear unit 3 prevented from swinging loosely from side to side and rocking on the axis of the rod or pin 18 when the gang is running on its carrying wheels 43. Preferably to this end we attach a cable 57 to the rear unit frame 12 at each side of the fore and aft shaft 20. These cables 57 hang loosely when the mowers are in operating position, Fig. 2, so as not to interfere with the action of the vertical knuckle 21 or with the rocking of unit 3 in the knuckles 14 to 16 during the mowing operations. However the cables 57 are to be tightened when the gang is elevated, and thus swing the rear unit to its center position, Fig. 1, and hold it there. This nullifies the effect of the vertical knuckle 21 and also substantially prevents rocking of the unit on the axis of 18 when the gang is carried by the carrying wheels 43 as in Fig. 3. Conveniently to this end the cables 57 are attached, one to each of two pulleys 58 fixed to shafts 45 which carry the carrying wheels 43, so that these cables wind up on these pulleys as the carrying wheels 43 are depressed and ultimately tighten them to the necessary extent.

Mechanism of any one of various kinds can be used to raise and lower the carrying wheels 43 and make any other necessary adjustments and it is not of primary importance whether this mechanism acts directly on the wheel brackets 44, on shafts 45, on the arms 46, or on the cross bar 47, or otherwise. Preferably however we use a power mechanism for this purpose, and mount this power mechanism on the gang itself. By doing this the need for gang-raising equipment on the tractor is eliminated, and accordingly the tractor may be substantially any tractor whatsoever as before indicated. Also the power unit itself may be of any one of various types. A simple form of power unit for the present purposes, and one that we prefer, is illustrated in the drawings. Principally this power unit comprises a cylinder 60 containing a ram or piston 61 which is connected at its oposite end to the cross bar 47 or to the member 53 on it. The cylinder 60 itself is hinged at 62 to a standard 62a rising from a sleeve 62b pinned on the rod or pivot pin 18 and thereby held upright. Such minor rocking as the power unit is thus subjected to is accommodated by looseness at the cross bar 47. The piston 61 is designed to be driven outwardly from the cylinder 60, to the left as shown in Figs. 2 and 3, and thus depress the carrying wheels 43 and tighten the various cables, by oil pumped into the forward end of the cylinder. To this end a reservoir 63 for oil is provided and from this (see Fig. 5) a connection 64 leads to the in-take 65 of a centrifugal or gear pump 66 driven by an electric motor 67 and forcing oil through a pipe 68 to the forward end of the cylinder 60. A check valve 69, seating toward the pump 66, may be provided between the cylinder and the pump. A return for the oil from the power cylinder 60 to the reservoir 63 is provided at 70. This leads back through a valve 71 to prevent oil flowing from the cylinder to the reservoir until it is time to raise the wheels. For safety's sake, this valve 71 may be spring-pressed toward the cylinder 60 so as to act as a relief valve to limit the pressure that can be applied to the cylinder 60 and its piston 61. However between them the valves 69 and 71 trap in the cylinder any oil that may be pumped into it, and thus make it unnecessary to keep the pump and motor in continuous operation in order to maintain the carrying wheels 43 in gang-carrying positions. Also the valve 71 is provided with a hinged lifter 72 adapted to be operated by a cord 73 going back to the driver's seat on the tractor, so that when it is necessary to release the pressure in the cylinder 61 the driver need simply pull on this cord 73. A spring 74, connected to the ram or piston 61 and to the opposite end of the cylinder 60, which is extended as oil is pumped into the cylinder, serves to retract cross bar 47 and thus raise the carrying wheels 43, etc., when the oil is released from the cylinder. The motor 67 may be driven by a storage battery, for example. However rather than provide a storage battery directly on the gang, or a special battery on the tractor, we prefer to drive this motor 67 and therewith the pump 66 by power taken from the tractor, and it may be from the starting battery of the tractor. Conductors to carry this current to the motor are shown conventionally at 76 in Fig. 5, and a switch for this circuit may be provided at the driver's seat on the tractor.

The operation of the machine illustrated has already been described in part. In normal operation in cutting grass the carrying wheels 43 are held elevated and the various cables are held relaxed by the power unit spring 74, and the gang of mower units is drawn over the ground by the tractor 30 as before described and as represented in Fig. 2. When it becomes necessary to move the machine from one place of operation to another, the tractor driver closes the circuit 76 supplying the motor 67, which thereupon pumps oil to the power cylinder 60 and in turn the piston of this cylinder depresses the carrying wheels 43 and thereby lifts the gang from the ground as a unit. In doing this the cables 49 and 57 are tightened, thereby nullifying the various knuckles and hinges (excepting that at 33, 34), and forcing the bracket 32 and tractor 30 to take a part of the weight of the gang. The parts then have the positions of Fig. 3. As soon as the gang is thus raised, the driver may open the switch of the motor circuit. The mower units being held well above the ground, and substantially rigid one with respect to another, the gang can be towed over obstructions such as street curbs, and the carrying wheels 43 being equipped with pneumatic tires, for example, the gang and its tractor are readily run through streets substantially as readily as any other item of traffic. When a new place of operation has been reached the tractor driver restores the gang to operation again simply by pulling the cord momentarily. This opens the valve 71 and allows the power spring 74 to return to the piston 61 toward the power end of the cylinder and thereby raise the carrying wheels 43 to their inoperative position and relax the various cables, Fig. 2.

It will be understood of course that the machine as described and illustrated is subject to much modification without departing from our invention. Additional to various possible modifications referred to before, it is immaterial whether or not the reels 6 are rotated by the mower ground wheels 5 or otherwise. Also the number of gang-carrying wheels employed is not of primary importance to my invention. Likewise the construction of the various mower units, the number used and their assembly into a gang, and the manner of hinging the units to each other if hinging is employed, are all subject to considerable variation as will be obvious, although we prefer the type of gang illustrated at present. Also as before indicated the form of the power unit employed, if any, is not of primary importance, although that illustrated and described is a form that we prefer for the present purpose. The foregoing are not the only parts of the machine illustrated that may be modified however, as will be apparent, but in general our invention is not limited to the details of construction and operation illustrated and described, except as appears hereafter in the claims. Also the claims are to be understood as including not only the specific elements mentioned in them, but also the equivalents of those elements.

We claim:

1. A multiple unit lawn mower comprising a plurality of mower units including ground wheels for supporting the units on the ground, interconnections uniting said units for operation as a gang and with said mower units forming a substantially rigid structure, at least one vertically movable wheel to support said structure and mounted on said structure, mechanism elevating or depressing said structure and wheels thereby raising or lowering said mower units with respect to the ground, a draft member attached to the forward portion of said substantially rigid structure by a horizontal hinge having an axis which extends generally transversely to the direction of motion of the mower, said draft member to be attached at its forward end to a tractor, and at least one flexible member attached at one of its ends to the said mechanism and attached at the other of its ends to the forward portion of the draft member, the intermediate portion of said flexible member running under a guide member on the lower portion of the said structure and being tightened when the mechanism is actuated in retracting the mower units from the ground, said hinge rigidly connecting the draft member and the said structure when the flexible member is so tightened.

2. A multiple unit lawn mower comprising a plurality of mower units each of which includes ground wheels for supporting the respective unit on the ground, connections flexibly uniting said mower units and therewith forming a unitary structure for mowing, at least one wheel to support said structure while being moved from one place of operation to another, said wheel being mounted on said structure for movement to and from the ground, a cylinder mounted on said structure, a piston in said cylinder connected to said supporting wheel to press the same to the ground and therethrough raise said structure, to raise said mower units from the ground and mount the structure on said wheel, a pump on said structure to force fluid into said cylinder, and a motor to drive said pump, a draft member attached to the forward portion of said unitary structure by a horizontal hinge having an axis which extends generally transversely to the direction of motion of the mower, said draft member being adapted to be attached at its forward end to a tractor, at least one flexible member attached at one of its ends to the said mechanism and attached at the other of its ends to the forward portion of the draft member, the intermediate portion of said flexible member running under a guide member on the lower portion of the said structure and being tightened when the mechanism is actuated in retracting the mower units from the ground, said hinge rigidly connecting the draft member and the said structure when the flexible member is so tightened.

3. The subject matter of claim 2, said pump forcing fluid into said cylinder and moving its piston in one direction and a spring is provided moving the piston in the opposite direction.

4. The subject matter of claim 2 wherein a valve is provided, between the cylinder and said pump, confining in the cylinder fluid pumped into it by the pump.

5. The subject matter of claim 4, a second valve, openable by the operator, releasing from the cylinder fluid pumped into the cylinder.

6. A multiple unit lawn mower having at least three mower units each including ground wheels for carrying its cutting mechanism on the ground, two of said units being placed in a row and the third being placed to cut an intermediate strip uncut by the said two units, connections uniting said mower units into a unitary operating structure, said connections providing a hinge having a fore and aft axis between the said two mower units which are in a row and a vertical hinge between said row and the third mower unit, and uniting said three units substantially rigidly so far as concerns any horizontal axis transverse of the gang is concerned, at least two wheels, at opposite sides of the fore and aft center line of said structure and mounted movably on said structure for movement toward and from the ground, retracting the mower units and a power unit mounted on said structure to press said wheels to the ground to raise said structure and thereby lift said mower units from the ground and to raise said wheels from the ground, at least one flexible member operated by said power unit rigidly contracting said hinges and partially supporting the weight of the mower units when said wheels are depressed, and rendering said hinges effective when said wheels are raised.

7. A multiple unit lawn mower comprising a plurality of mower units arranged side by side in a front and a rear row each of which is transverse to the direction of movement of the mower, adjacent mower units in the front row connected by horizontal hinges running in the direction of motion of the mower, each mower unit in the rear row situated behind the connection between two adjacent mower units in the front row and attached to the front row by a connection permitting movement with respect to the front row about a substantially vertical axis running through said connection, at least one crank arm pivoted centrally on units of the front row, one free end of said crank arm having a wheeled structure mounted thereon and the other free end being actuated by hydraulic means by forcing the wheel downwardly into the ground simultaneously raising the mower units from contact with the ground, a draft member attached to the forward portion of the front row of mower units by a horizontal hinge having an axis which extends transversely to the direction of motion of the mower, said draft member being attached at its forward end to a tractor, at least one flexible member attached at one of its ends to the actuated end of the crank arm and attached at the other of its ends to the forward portion of the draft member, the intermediate portion of said flexible member running under a guide member on the lower portion of the front row and being tightened when the mower units have been retracted from the ground, said hinge rigidly connecting the draft member and the first row when the flexible member is so tightened.

8. The subject matter claimed in claim 7 wherein at least one chain runs from the forward portion of each mower unit in the rear row to a portion of a wheeled structure in such a manner that it is tightened while the mower units are retracted and prevents excess motion of a mower unit in the rear row about its connection with the front row.

9. The subject matter claimed in claim 7 wherein the hydraulic means comprising a cylinder and piston means for providing fluid under pressure to the cylinder for actuating the piston, and valves so arranged as to enable the fluid to be trapped in the cylinder to lock the wheeled structure in downward position.

10. The subject matter as claimed in claim 7 wherein a resilient member connects the actuated end of the crank arm to the front row of mower units so as to cause the wheeled structure to retract upwardly when the hydraulic means is released.

EDMUND R. SAWTELLE.
JOHN I. BLAIR.
HERBERT IMBT.

REFERENCES CITED

The following references are of record in the file of this patent:

UNITED STATES PATENTS

| Number | Name | Date |
|---|---|---|
| 650,273 | Potter et al. | May 22, 1900 |
| 1,619,904 | Wenndt | Mar. 8, 1927 |
| 1,725,375 | Seeley | Aug. 20, 1929 |
| 1,969,684 | Bird | Aug. 7, 1934 |
| 2,059,205 | Buffington | Nov. 3, 1936 |
| 2,377,380 | Sawtelle et al. | June 5, 1945 |